(12) United States Patent
Ambrose et al.

(10) Patent No.: US 7,163,748 B2
(45) Date of Patent: *Jan. 16, 2007

(54) METHOD FOR MAKING SOLID, UNGELLED AMINOPLAST CROSSLINKERS

(75) Inventors: Ronald R. Ambrose, Pittsburgh, PA (US); Thomas A. Cook, Gibsonia, PA (US); Shengkui Hu, Baden, PA (US); Jonathan T. Martz, Glenshaw, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 440 days.

This patent is subject to a terminal disclaimer.

(21) Appl. No.: 10/434,682

(22) Filed: May 9, 2003

(65) Prior Publication Data

US 2004/0224146 A1    Nov. 11, 2004

(51) Int. Cl.
*B23B 27/00*    (2006.01)
(52) U.S. Cl. .................. 428/423.1; 428/403; 428/404; 428/405; 428/406; 428/407; 528/406; 525/329.9; 544/88
(58) Field of Classification Search ................ 428/403, 428/404, 405, 406, 407, 423.1; 528/406; 525/329.9; 544/88
See application file for complete search history.

(56) References Cited

U.S. PATENT DOCUMENTS

| 6,316,109 B1 * | 11/2001 | Ambrose et al. ........ 428/423.1 |
| 6,441,103 B1 | 8/2002 | Ambrose et al. ........... 525/424 |
| 6,451,928 B1 | 9/2002 | Ambrose et al. ........... 525/443 |

FOREIGN PATENT DOCUMENTS

| WO | WO 03/011934 | 2/2003 |
| WO | WO 03/011936 | 2/2003 |

* cited by examiner

*Primary Examiner*—Leszek B. Kiliman
(74) *Attorney, Agent, or Firm*—Diane R. Meyers

(57) ABSTRACT

Methods for preparing crosslinking agents that are the ungelled reaction product of (a) at least one aminoplast resin and (b) at least one modifying compound, wherein the crosslinking agents are essentially free of active hydrogen functional groups and have a glass transition temperature of at least 10° C. are disclosed. The methods include, inter alia, the use of vacuum and/or increased rates of inert gas introduction during reaction.

12 Claims, No Drawings

METHOD FOR MAKING SOLID, UNGELLED AMINOPLAST CROSSLINKERS

FIELD OF THE INVENTION

The present invention relates to methods for making crosslinking agents based on modified aminoplast resins and to powder coating compositions containing these crosslinking agents.

BACKGROUND OF THE INVENTION

In recent years, powder coatings have become increasingly popular because these coatings are inherently low in volatile organic content ("VOC"). The low VOC significantly reduces air emissions into the atmosphere during application and curing as compared to liquid coatings.

Hydroxyl, carboxyl, carbamate, and/or epoxy functional resins, such as acrylic and polyester resins having relatively high glass transition temperatures ("Tg"), are commonly used as the main film-forming polymers for powder coatings. The relatively high Tg of such polymers provides powder coatings having good storage stability. When exposed to the extreme temperatures both during shipping and/or storage, however, even better powder coating stability is desired. By "stability" or "storage stability" is meant the ability of the individual powder particles that comprise the powder coating to resist the tendency to adhere to one another, which causes "clumping" or "fusing" of the powder coating composition. Powder coating compositions having very poor storage stability can be difficult, if not impossible, to apply.

Aminoplast resins are well known in the art as low cost crosslinking agents for hydroxyl, carboxyl, and/or carbamate functional polymers in conventional liquid coating compositions. Aminoplast resins can impart enhanced properties to the coatings, such as exterior durability, chemical resistance, and mar resistance. Attempts to produce powder coating compositions based on conventional aminoplast resins that provide these desirable properties often give unsatisfactory results because these materials are typically in liquid form. In addition to problems with incorporating the liquid aminoplast into the powder coating, their incorporation, when successful, can result in a coating having poor powder stability.

Methoxylated aldehyde condensates of glycoluril, which are solid aminoplast resins, are employed as crosslinking agents in powder coating compositions. Although solid in form, these materials can still depress the Tg of the powder coating composition significantly, even when combined with high Tg film-forming polymers such as the acrylic polymers discussed above. A depression in Tg can also result in poor powder stability.

Moreover, the use of conventional aminoplast resins in powder coating compositions can result in the phenomenon commonly referred to as "gassing". Gassing can occur as a result of vaporization of the alcohol generated in the thermally induced aminoplast crosslinking reaction. The alcohol vapor is driven off through the coating film upon heating; as the viscosity of the coating increases during the curing process, "pinholes" or "craters" are formed as the gas escapes through the coating surface.

Thus, there is a need in the art for improved aminoplast crosslinkers that can be used with powder coatings. Improved methods for making such crosslinkers are also desired.

SUMMARY OF THE INVENTION

The present invention is directed to methods for making a crosslinking agent comprising the ungelled reaction product of (a) at least one aminoplast resin; and (b) at least one modifying compound.

As discussed above, the incorporation of aminoplast resins into powder coatings has been difficult to achieve. Use of modified aminoplasts that are in solid, ungelled form overcomes these difficulties. The present invention provides improved methods for making such ungelled aminoplasts. An "ungelled" product is one that has a measurable intrinsic viscosity when dissolved in a suitable solvent; a gelled product, in contrast, is one whose intrinsic viscosity when dissolved in a solvent is too high to measure. In addition, an ungelled product can be melted, solidified, and remelted. The ungelled products prepared according to the present invention can therefore be incorporated into powder coatings and processed according to methods standard in the art. Significantly, powder coatings containing the modified aminoplasts prepared according to the present methods give good performance, have good stability and are easy to use.

DETAILED DESCRIPTION OF THE INVENTION

The present invention is directed to methods for making crosslinking agents comprising an ungelled reaction product of (a) at least one aminoplast resin and (b) at least one modifying compound. The crosslinking agents that result from the present methods are substantially free of active hydrogen functional groups that are reactive with an aminoplast resin, and have a Tg of at least 10° C.

The present methods comprise the steps of: mixing at least one aminoplast resin and at least one modifying compound; heating the admixture to a temperature ranging from 90° C. to 160° C.; and maintaining the temperature for a time sufficient to obtain an ungelled reaction product that has a Tg of at least 10° C. and that is essentially free of active hydrogen functional groups. In one embodiment, the reaction is carried out under vacuum.

The aminoplast resin and modifying compound are combined in a suitably equipped reaction vessel, typically with an appropriate strong acid as catalyst and optionally a suitable solvent. Any suitable solvent can be used, with aromatic solvents being most often employed. Examples of suitable aromatic solvents include xylene, toluene, and mixtures of these solvents. It is a feature of the present invention, however, that the reaction can be carried out in the absence of solvent; this eliminates the need to evaporate or otherwise remove the solvent in order to obtain a powdered product. Examples of strong acids suitable for use as a catalyst include, but are not limited to, para-toluene sulfonic acid, dodecyl benzene sulfonic acid, and dodecyl benzene disulfonic acid. Normal condensation techniques well known in the art can be used. The reaction admixture is heated to a temperature ranging from 90° C. to 160° C., usually from 100° C. to 150° C., and held at that temperature for a period sufficient to obtain an ungelled product having a Tg of at least 10° C. The reaction is terminated when the reaction end point (e.g., the disappearance of active hydrogen-containing groups) is determined by appropriate analytical methods. The appropriate analytical method will vary depending on the active hydrogen-containing group at issue, which, in turn, depends on the modifying compound used. For example, the disappearance of carboxylic acid functionality can be measured by acidity measurements and the disappearance of hydroxy functionality by infrared spectroscopy. An active hydrogen-containing group will be understood as referring to a functional group having at least one reactive hydrogen.

During the heating step, which is when the reaction between the aminoplast resin and modifying compound takes place, the reaction vessel can be maintained under vacuum. Vacuum can be applied by connecting the reaction system to a vacuum pump or other vacuum generating devices. The vacuum can be applied at any suitable level; "suitable level" and like terms, when used herein to describe the vacuum, refers to that level of vacuum (negative pressure) needed to substantially remove the by-product, driving the reaction equilibrium to the right (see reaction equation below) and producing the crosslinker. This will typically be at least about 150 mmHg absolute vacuum. Typically, the reaction between the aminoplast resin and modifying compound starts very quickly and slows down as the reaction proceeds. It was surprisingly discovered that the reaction rate is increased by running at least some of the reaction under vacuum. In a particularly suitable embodiment, substantially all of the reaction is run under vacuum. "Substantially all" and like terms as used in this context means at least 95 percent of the reaction. When substantially all of the reaction is run under vacuum, the reaction rate between the aminoplast and modifying compound is typically increased by 10 to 100 percent. It will be appreciated, however, that running any portion of the reaction under a suitable level of vacuum will increase the reaction rate to at least some extent. Accordingly, the present invention is further directed to a method for increasing the reaction rate between an aminoplast resin and a modifying compound comprising carrying out the reaction under vacuum. An "increase in reaction rate" and like terms refers to a decrease in the amount of time that it takes for the starting materials to form an ungelled reaction product that is substantially free of active hydrogen-containing groups.

It has also been surprisingly discovered that an increase in reaction rate can be achieved by increasing the rate at which an inert gas is passed through the reaction vessel during the reaction. Accordingly, the present invention is further directed to a method for increasing the reaction rate between an aminoplast resin and a modifying compound comprising increasing the rate at which an inert gas is passed through the reaction vessel. Generally, the inert gas should be introduced at a rate so as to replace the volume of the reactor.

The reaction between the aminoplast resin and the modifying compound is an equilibrium reaction that can be generally represented as follows:

As by-product builds up in the reaction vessel, it can cause the reaction to reverse an undesirable result because the complete conversion of the reactants to product is hindered. Use of vacuum and/or increase in the rate at which an inert gas is passed through the reaction vessel both result in more efficient removal of the by-product. This keeps the reaction equilibrium in favor of the product. The methods are particularly relevant when the modifying compound contains carboxylic acid functional groups, although the invention is not so limited.

In the present methods, the aminoplast resin and the modifying compound are combined in a ratio such that the resulting reaction product is substantially free of active hydrogen-containing groups, such as hydroxyl groups, carboxylic acid groups, amino N—H groups and amido N—H groups. Any ratio of (a) to (b) that allows this result to be achieved is within the present invention. The reaction is monitored for the disappearance of active hydrogen-containing groups via an appropriate analytical method. When a carboxylic acid is the modification agent, the reaction is generally terminated when the product contains acid equivalent to <15 mg KOH per gram of product. The "appropriate analytical method" will vary depending on the active hydrogen group at issue. For example, acidity measurement can be used to determine the disappearance of carboxylic groups and infrared spectroscopy can be used to determine the disappearance of hydroxyl groups.

One aspect of the present methods is that the reaction between the aminoplast resin and modifying compound is run to completion, i.e. until substantially all of the modifying compound is reacted with the aminoplast. The reaction is also run so as to not promote or allow a significant amount (i.e.<5%) of self-condensation of the aminoplast. Thus, the present methods are distinct from many methods described in the art where similar starting materials are used; those methods either promote or otherwise allow self-condensation of the aminoplast, which results in a gelled or partially gelled material, or the reaction is not run to completion, such that reactive groups from the coreactant(s), such as OH, $NH_2$ or carboxyl groups, are present in the reaction product.

Aminoplast resins are based on the condensation product of an aldehyde with an amino- or amido-group containing compound. While the aldehyde employed is most often formaldehyde, other aldehydes such as acetaldehyde, crotonaldehyde, acrolein, benzaldehyde, furfural, and glyoxal can also be used. Amine/amide containing compounds include those derived from at least one of glycoluril, aminotriazine, or benzoguanamine. Such compounds include, for example, alkoxyalkyl derivatives of melamine, glycoluril, benzoguanamine, acetoguanamine, formoguanamine, spiroguanamine, and the like. Condensation products obtained from the reaction of alcohols and formaldehyde with melamine, urea or benzoguanamine are most common and most suitable for use in the present invention. Condensation products of other amines and amides can also be employed, for example, aldehyde condensates of triazines, diazines, triazoles, guanadines, guanamines, and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, and 3,4,6-tris(ethylamino)-1,3,5 triazine.

Aminoplast resins typically contain methylol or other alkylol groups and, in most instances, at least a portion of these alkylol groups are etherified by a reaction with an alcohol. Any monohydric alcohol can be employed for this purpose, including such alcohols as methanol, ethanol, propanol, butanol, pentanol, hexanol, cyclohexanol, heptanol, and others, as well as benzyl alcohol, and other aromatic alcohols, cyclic alcohols such as cyclohexanol, monoethers of glycols, and halogen-substituted or other substituted alcohols, such as 3-chloropropanol and butoxyethanol. Aminoplast resins that are substantially alkylated with methanol or butanol are particularly suitable for use herein.

Nonlimiting examples of suitable aminotriazine compounds suitable for use in the present invention include alkoxyalkyl aminotriazines, such as (methoxymethyl) melamine-formaldehyde resin, for example CYMEL 300, CYMEL 303, RESIMENE 745, and RESIMENE 757; ethylated-methylated benzoguanamine-formaldehyde resin, for example CYMEL 1123; and methylated-butylated melamine-formaldehyde resin, for example CYMEL 1135, CYMEL 1133, and CYMEL 1168. These products are commercially available from either Cytec Industries, Inc. (CYMEL) or Solutia, Inc. (RESIMENE).

In another embodiment of the present invention, the aminoplast resin (a) comprises a compound derived from glycoluril, such as alkoxylated aldehyde condensates of glycoluril. The alkoxylated aldehyde condensates of glycoluril suitable for use as the aminoplast resin (a) can be prepared by reacting glycoluril, or acetylene diurea, with an aldehyde, typically formaldehyde, to form tetra-alkylol glycoluril. In this embodiment, the alkylol groups are usually etherified with a mono-alcohol, such as a $C_1$ to $C_6$ monoalcohol, to form tetra-alkoxy alkyl glycoluril. An example of such a tetra-alkoxyalkyl glycoluril is tetra-methoxy methyl glycoluril, which is commercially available as POWDERLINK 1174 from Cytec Industries, Inc.

In addition to the aminoplast resin (a), the reactants used in the present methods further comprise (b) at least one modifying compound.

"Modifying compound" refers to any compound that will react with an aminoplast and that, upon reaction, renders the aminoplast suitable for use in a powder coating. Generally, the modifying compound is one that contains at least one active hydrogen group. Whether the modified aminoplast is suitable for use in a powder coating can be determined by performing the reaction described above. If the starting aminoplast is liquid, "suitable" refers to making it an ungelled, solid product. If the aminoplast is already ungelled, "suitable" means that the aminoplast is modified so as not to lower the Tg of the powder coating to which it is added or is modified to lower the amount of gassing that is seen during cure as compared to the unmodified starting aminoplast.

Examples of suitable modifying compounds include but are not limited to the following:

an aromatic heterocycle containing at least one nitrogen atom. An "aromatic heterocycle containing at least one nitrogen atom" refers to a compound comprising an aromatic ring or rings, fused or unfused, in which at least one member of the ring(s) is a nitrogen atom having an active hydrogen attached thereto. The aromatic ring(s) can contain more than one nitrogen, which may or may not have an active hydrogen attached thereto; the ring(s) can be substituted or unsubstituted. Any substituent that does not interfere with the reaction between the aminoplast resin and the aromatic heterocycle containing at least one nitrogen atom can be present, such as one or more monovalent hydrocarbon groups. A "monovalent hydrocarbon group" is an organic group containing carbon and hydrogen. These hydrocarbon groups may be aliphatic or aromatic, and may contain from 1 to 24 (in the case of aromatic from 3 to 24) carbon atoms. A "monovalent hydrocarbon group" can also be a heteroatomic hydrocarbon group; that is, one or more of the carbon molecules in the group can be substituted with heteroatoms, typically oxygen or nitrogen. Nonlimiting examples of such monovalent hydrocarbon groups include alkyl, alkoxy, aryl, alkylaryl and alkoxyaryl groups; substituents can be present on any of the molecules within the ring(s) so long as the active hydrogen attached to the nitrogen remains free for reaction with the aminoplast resin. Alkyl substituted compounds suitable for use in the present invention are widely commercially available. Specific examples of suitable aromatic heterocycles containing at least one nitrogen atom include triazoles, imidazoles, pyrazoles, indoles, and pyrroles;

a reactive polyhydric compound, such as one having two or more groups that are reactive toward the aminoplast including but not limited to diols and triols. Examples of suitable diols include but are not limited to cycloaliphatic diols such as hydrogenated Bisphenol A, cyclohexane dimethanol, cyclohexane diol and mixtures thereof. Examples of suitable triols include but are not limited to trimethylol propane, tris(hydroxyethyl) isocyanurate, and mixtures thereof;

a polyester polyol; any polyester having two or more reactive hydroxyl groups can be used, including but not limited to one comprising the condensation reaction product of a cycloaliphatic polyol and a cyclic polycarboxylic acid or anhydride. For example, the cycloaliphatic polyol can be any polyhydric cycloaliphatic compound known in the art including but not limited to hydrogenated bisphenols such as Bisphenols A, F, E, M, P, Z and the like; cyclohexyl dimethanol, cyclohexane diol and mixtures thereof; the cyclic polycarboxylic acid/anhydride can be any cyclic compound having two or more carboxylic acid groups per molecule, including but not limited to hexahydrophthalic acid, phthalic acid, isophthalic acid, terephthalic acid, anhydrides thereof and mixtures thereof;

a polyhydric aromatic compound, having one or more aromatic rings, fused or unfused, of which polyhydric phenols and dihydric aromatic compounds are examples;

a reactive urethane group such as one formed by the reaction of a polyester polyol and a monoisocyanate, or such as one formed from the reaction of a polyisocyanate and a monohydric capping agent; the polyester polyol can be any polyester having two or more reactive hydroxyl groups. Any isocyanate that is monofunctional with respect to the NCO group can be used; examples include but are not limited to cyclohexyl isocyanate, phenyl isocyanate, butyl isocyanate and mixtures thereof. Similarly, any isocyanate having polyfunctionality can be used including but not limited to aliphatic polyisocyanates, cycloaliphatic polyisocyanates, aromatic polyisocyanates, higher polyisocyanates and mixtures thereof. The monohydric capping agent can comprise a wide variety of mono-hydroxyl functional materials including but not limited to aliphatic alcohols, especially those having 1 to 6 carbons, and aromatic alcohols;

a monofunctional sulfonamide having only one active hydrogen, examples of which include but are not limited to saccharin and N-alkyl-p-toluene sulfonamide;

a carboxylic acid-containing compound, which is any compound that has at least one carboxylic acid functional group and has the appropriate acidity (i.e. a pKa of >3, such as >4). "pKa" values reported herein refer to pKa as measured in deionized water at 25° C. "pKa" will be understood as a means for expressing the strength of acids; the weaker the acid, the larger the pKa. If the pKa of the carboxylic acid-containing compound is below about 3, the acid will catalyze the self-condensation of the aminoplast resin; this will result in a gelled rather than an ungelled reaction product. Similarly, the use of a polycarboxylic acid alone can result in a gelled product. Thus, the carboxylic acid-containing compound used in the present invention is most suitably a monofunctional acid, or a mixture of monofunctional and polyfunctional acids. If such an acid mixture is used, the polyfunctional acid should typically comprise ≦20 percent of the mixture. Aromatic carboxylic acids, such as benzoic acid and its derivatives, are particularly suitable. Derivatives of benzoic acid include those materials having substitutions on the phenyl ring of the benzoic acid molecule; examples include toluic acid, anisic acid, and 4-tert-butylbenzoic acid. Aromatic group-containing alkyl carboxylic acids such as cinnamic acid and phenyl acetic acid and its derivatives are also suitable; derivatives of these acids include compounds where the phenyl ring of the acid is substituted. Other suitable monofunctional carboxylic acids include, but are not limited to, hexahydrobenzoic acid, diphenyl acetic acid and those known to one skilled in the art. Polycarboxylic acids suitable for use with one or more monofunctional carboxylic acids include, for example, phthalic acid, terephthalic acid, and trimellitic acid;

a monohydroxy aromatic compound having structure (I):

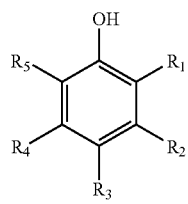

(I)

wherein each of $R_1$ through $R_5$ are the same or different and are selected from H, a monovalent hydrocarbon group, $COOR_6$ where $R_6$ is H or a monovalent hydrocarbon group, $NO_2$, halogen or $XR_7$, where X is oxygen or sulfur and $R_7$ is a monovalent hydrocarbon group having 1 to 8 carbon atoms;

compounds having structure (II):

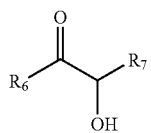

(II)

or dimer derivatives thereof as discussed below, where $R_6$ and $R_7$ are the same or different and each independently represents an aromatic group having 4 to 20 carbons or an alkyl group having 1 to 12 carbon atoms. Suitable aromatic groups, include but are not limited to phenyl, naphthyl, methoxy phenyl, or dimethylaminophenyl groups, and can also contain one or more heteroatoms, such as O, N, and S, either internal or external to the aromatic ring;

a dimeric derivative of a compound having the general structure (II) above.

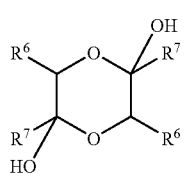

(III)

Such dimer derivatives can have the structure (III) above where $R^6$ and $R^7$ are as described above for the structure (I); and a tall oil rosin. A "tall oil rosin" is really a mixture of rosin acids, fatty acids, and other materials obtained by acid treatment of the alkaline liquors from the digesting (pulping) of pine wood. For example, tall oil rosin may comprise one or more of the following rosin acids ("ring structure components"): abietic acid, levopimaric acid, neoabietic acid, palustric acid, dehydroabietic acid, pimaric acid, and isopimaric acid. Tall oil rosin generally also contains different levels of fatty acids ("fatty acid components") such as linoleic acid and oleic acid. It may also contain certain levels of unsaponifiables, which generally includes all of the materials that lack acid functionality. Different grades of tall oil rosins are commercially available. The different grades have different levels of ring structure components, fatty acid components, and unsaponifiables. In general, fatty acid components will generally comprise less than 12 weight percent of the composition, such as less than 8 weight percent or such as 4 to 5 weight percent, the ring structure components will generally comprise from about 80 to 90 weight percent of the composition, and the remainder will predominantly be unsaponifiables.

Some modifying compounds useful in the present methods are described, for example, in U.S. Pat. Nos. 4,254,235; 4,255,558; 4,393,181; 4,698,401; 6,451,928; 6,316,109; 6,441,103; 6,479,611; 6,500,545, all of which are hereby incorporated by reference. Again, mixtures of any modifying compounds can be used.

The aminoplast resin (a) generally constitutes 90 weight percent or less, often 85 weight percent or less, and typically 80 weight percent or less of the reaction mixture, based on the total combined weight of reactants (a) and (b). Also, the aminoplast resin (a) generally constitutes at least 25 weight percent, often at least 35 weight percent, and typically at least 45 weight percent of the reaction mixture, based on the total combined weight reactants (a) and (b). The percent by weight of the aminoplast resin (a) present in the reaction mixture can range between any combination of these values inclusive of the recited values.

The modifying compound (b) generally constitutes 75 weight percent or less, often 65 weight percent or less, and typically 55 weight percent or less of the reaction mixture, based on the total combined weight of reactants (a) and (b). Also, the modifying compound (b) generally constitutes at least 10 weight percent, often at least 15 weight percent, and typically at least 20 weight percent of the reaction mixture, based on the total combined weight of reactants (a) and (b). The percent by weight of modifying compound (b) present in the reaction mixture can range between any combination of these values inclusive of the recited values.

The crosslinking agents made according to the present methods generally have a Tg of at least 10° C., often at least 15° C., usually at least 20° C., and typically at least 25° C. Also, the crosslinking agent generally has a Tg of less than 85° C., often less than 80° C., usually less than 75° C., and typically less than 70° C. The Tg of the crosslinking agent can range between any combination of these values, inclusive of the recited values. The Tg can be measured experimentally using differential scanning calorimetry (rate of heating 10° C. per minute, Tg taken at the first inflection point). Unless otherwise indicated, the stated Tg as used herein refers to the measured Tg.

In a specific embodiment, the present methods are directed to conversion of a liquid aminoplast resin into a solid, ungelled crosslinker by reacting an aminoplast with a modifying compound that, in this case, would be a powder forming compound. A "powder forming compound", as used herein, refers to a modifying compound that, when reacted with a liquid aminoplast resin in the manner and under the conditions described above, will result in an ungelled reaction product based on the aminoplast; the reaction product can function as a crosslinker. Whether a compound is a powder forming compound can be determined by performing the reaction described above and observing whether an ungelled reaction product is the result.

The present invention is also directed to a curable powder coating composition comprising a solid particulate, film-forming mixture of (1) a polymer containing reactive functional groups, and (2) one or more of the crosslinking agents prepared as described above. The polymer (1) can be selected from a variety of polymers having aminoplast-reactive functional groups well known in the art, so long as the Tg of the polymer is sufficiently high to permit the formation of a stable, solid particulate composition. The Tg of the polymer (1) generally is at least 30° C., often at least 40° C., and typically at least 50° C. The Tg of the polymer (1) also generally is less than 130° C., often less than 100° C., and typically less than 80° C. The Tg of the functional group-containing polymer (1) can range between any combination of these values inclusive of the recited values.

Examples of polymers having reactive functional groups useful in the curable powder coating compositions of the invention include acrylic, polyester, polyurethane, polyepoxide, and polyether polymers. The polymer (1) typically comprises reactive functional groups selected from hydroxyl, epoxy, carboxyl and/or carbamate functional groups, or a combination thereof. In one embodiment of the present invention, the polymer (1) comprises hydroxyl and/or carbamate functional groups. In another embodiment of the invention, the polymer (1) comprises epoxy and/or hydroxyl functional groups.

The functional group-containing polymer (1) generally is present in the curable powder coating compositions of the invention in an amount ranging from at least 5 percent by weight, often at least 20 percent by weight, typically at least 30 percent by weight, and usually at least 40 percent by weight based on the total weight of the powder coating composition. The functional group-containing polymer (1) also generally is present in the present powder coating compositions in an amount less than 95 percent by weight, often less than 90 percent by weight, typically less than 85 percent by weight, and usually less than 80 percent by weight based on the total weight of the powder coating composition. The amount of the functional group-containing polymer (1) in the powder coating compositions of the present invention can range between any combination of these values inclusive of the recited values.

The powder coating compositions of the present invention further comprise, as component (2), one or more of the crosslinking agents described above. The crosslinking agent (2) is generally present in an amount ranging from at least 2 percent by weight, often at least 10 percent by weight, typically at least 15 percent by weight, and usually at least 20 percent by weight based on the total weight of the powder coating composition. The crosslinking agent (2) also generally is present in an amount less than 95 percent by weight, often less than 80 percent by weight, typically less than 70 percent by weight, and usually less than 60 percent by weight based on the total weight of the powder coating composition. The amount of the crosslinking agent (2) present in the powder coating compositions of the present invention can range between any combination of these values inclusive of the recited values. It has been surprisingly discovered that the crosslinkers prepared according to the present invention may, when incorporated into coatings, give better results than coatings made with similar crosslinkers prepared in a different manner. The short reaction time of the present methods generally yields crosslinkers with lower melt viscosity compared to a product made using longer reaction time. Crosslinkers with lower melt viscosity normally result in smoother coatings.

The components (1) and (2) of the curable powder coating composition may each independently comprise one or more functional species, and are each present in amounts sufficient to provide cured coatings having a desirable combination of physical properties, e.g., smoothness, optical clarity, scratch resistance, solvent resistance and hardness.

As used herein, the term "reactive" refers to a functional group that forms a covalent bond with another functional group under suitable reaction conditions.

As used herein, "cure" and like terms as used in connection with a composition, e.g., "a curable composition" or "cured coating", shall mean that any crosslinkable components of the composition are at least partially crosslinked. In certain embodiments of the present invention, the crosslink density of the crosslinkable components, i.e., the degree of crosslinking, ranges from 5 to 100 percent of complete crosslinking. In other embodiments, the crosslink density ranges from 35 to 85 percent of full crosslinking. In other embodiments, the crosslink density ranges from 50 to 85 percent of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the Tg and crosslink density of free films of coatings or polymers. These physical properties of a cured material are related to the structure of the crosslinked network.

If desired, the powder coating compositions of the present invention can also include an adjuvant curing agent different from the crosslinking agent (2). The adjuvant curing agent can be any compound having functional groups reactive with the functional groups of the polymer (1) or the crosslinking agent (2) described above. Nonlimiting examples of suitable adjuvant curing agents include blocked isocyanates, triazine compounds, conventional aminoplasts, glycoluril resins, and mixtures thereof; the use of these compounds is well known in the art.

A glycoluril resin particularly suitable for use as the adjuvant curing agent is POWDERLINK 1174, commercially available from Cytec Industries, Inc. of Stamford, Conn.

When employed, the adjuvant curing agent generally is present in the powder coating compositions in an amount ranging from 5 to 10 percent by weight, often from 5 to 20 percent by weight, typically from 5 to 30 percent by weight, and usually from 5 to 50 percent by weight based on the total weight of the powder coating composition. When a triazine compound is used, it is typically present in the powder coating composition of the present invention in an amount ranging up to about 20 percent by weight, and usually from about 1 to 20 percent by weight, percent by weight being based on the total weight of the powder coating composition. Mixtures of the adjuvant curing agents can also be used advantageously.

Also, it should be understood that, for purposes of the present invention, the curable powder coating compositions that contain epoxy group-containing polymers typically also include an epoxide-reactive curing (i.e., crosslinking) agent, usually an acid functional curing agent, in addition to the aminoplast-based crosslinking agent (2). A secondary hydroxyl group can be generated upon reaction of each epoxy functional group with a functional group of the epoxide-reactive curing agent. These secondary hydroxyl groups are then available for further reaction with the aminoplast-based crosslinking agent (2). Suitable epoxide-reactive curing agents may have functional groups selected from the group consisting of hydroxyl, thiol, primary amines, secondary amines, acid (e.g. carboxylic acid), and mixtures thereof. Useful epoxide reactive curing agents having amine functionality include, for example, dicyandiamide and substituted dicyandiamides. Preferably, the epoxide reactive curing agent has carboxylic acid groups.

The powder coating compositions of the present invention can further include additives commonly known in the art. Typical additives include benzoin, used to reduce entrapped air or volatiles; flow aids or flow control agents, which aid in the formation of a smooth and/or glossy surface, for example, MODAFLOW available from UCB Chemical Company; waxes such as MICROWAX C available from Hoechst; fillers such as calcium carbonate, barium sulfate and the like; pigments and dyes as colorants; UV light stabilizers such as TINUVIN 123 or TINUVIN 900 available from CIBA Specialty Chemicals and catalysts to promote the various crosslinking reactions. Such additives are typically present in the powder coating compositions of the present invention in an amount ranging from 1 to 60 weight percent based on total weight of the powder coating composition.

The powder coating compositions of the invention can be prepared by any means known in the art, such as by blending the functional group-containing polymer (1) and the crosslinking agent (2) in a Henschel blade blender. The mixture is then usually extruded through a Baker-Perkins twin screw extruder at a temperature ranging from 158° F. to 266° F. (70° C. to 130° C.). The resultant chip is usually ground and classified to an appropriate particle size, typically between 20 and 200 microns, in a cyclone grinder/sifter.

The powder coating compositions of the invention can be applied to a variety of substrates including metallic substrates, for example, aluminum and steel substrates, and non-metallic substrates, for example, thermoplastic or thermoset composite substrates. The powder coating compositions are typically applied by spraying, and in the case of a metal substrate, by electrostatic spraying which is preferred, or by the use of a fluidized bed. The powder coating can be applied in a single sweep or in several passes to provide a film having a thickness after cure of from about 1 to 10 mils (25 to 250 micrometers), usually about 2 to 4 mils (50 to 100 micrometers).

Generally, after application of the powder coating composition, the powder coated substrate is heated to a temperature sufficient to cure the coating, typically to a temperature ranging from 250° F. to 500° F. (121.1° C. to 260.0° C.) for 1 to 60 minutes, and preferably from 300° F. to 400° F. (148.9° C. to 204.4° C.) for 15 to 30 minutes.

The curable powder coating composition can be applied as a primer or primer surfacer, or as a top coat, for example, a "monocoat". In one embodiment, the present invention is directed to a curable powder coating composition that is advantageously employed as a top coat in a multi-layer composite coating composition. Such a multi-layer composite coating composition generally comprises a film-forming base coat, which typically is deposited from a film-forming base coating (typically pigmented) composition, and a top coat applied over the base coat, the top coat being deposited from the curable powder coating composition of the present invention. In a particular embodiment, the multi-component composite coating composition is a color-plus-clear system where the top coat is deposited from a powder coating composition that is substantially pigment-free, i.e., a clear coat.

The film-forming composition from which the base coat is deposited can be any of the compositions useful in coatings applications, for example, in automotive applications where color-plus-clear systems are most often used. A film-forming composition conventionally comprises a resinous binder and often a pigment to serve as a colorant. Particularly useful resinous binders include acrylic polymers, polyesters including alkyds, and polyurethanes.

The resinous binders for the base coat can be organic solvent-based materials, such as those described in U.S. Pat. No. 4,220,679. Water-based coating compositions, such as those described in U.S. Pat. Nos. 4,403,003; 4,147,679; and 5,071,904, can also be used as the base coat composition.

As mentioned above, the base coat compositions also can contain pigments of various types as colorants. Suitable metallic pigments include aluminum flake, bronze flake, copper flake, and the like. Other examples of suitable pigments include mica, iron oxides, lead oxides, carbon black, titanium dioxide, talc, as well as a variety of color pigments.

Optional ingredients for the base coat film-forming compositions include those that are well known in the art of surface coatings and include surfactants, flow control agents, thixotropic agents, fillers, anti-gassing agents, organic co-solvents, catalysts, and other suitable adjuvants.

The base coat film-forming compositions can be applied to the substrate by any of the conventional coating techniques, such as brushing, spraying, dipping or flowing, but they are most often spray-applied. The usual spray techniques and equipment for air spraying, airless spraying and electrostatic spraying can be used.

The base coat film-forming compositions are typically applied to the substrate so that a cured base coat will have a dry film thickness ranging from 0.5 to 4 mils (12.5 to 100 micrometers). After forming a film of the base coat on the substrate, the base coat can be cured or alternatively given a drying step in which solvent, i.e., organic solvent and/or water, is driven off by heating or an air drying step before application of the clear coat. Suitable drying conditions will depend on the particular base coat film-forming composition and on the ambient humidity with certain water-based compositions. In general, a drying time ranging from 1 to 15 minutes at a temperature of 75° F. to 200° F. (21° C. to 93° C.) is adequate.

The curable powder top coating composition can be applied over at least a portion of the base coat by any of the methods of application described above. The curable powder top coating composition can be applied to a cured base coat or a dried but uncured base coat. In the latter case, the top coat and the base coat are cured simultaneously.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Plural encompasses singular and vice versa. Also, while use of certain components of the present invention may be described in the singular in certain places, this should not be read as limiting the invention to the singular. For example, some portions of the specification may describe use of "a" modifying compound, although the invention clearly encompasses use of any combination of modifying compounds. As used herein, the term "polymer" refers to oligomers and both homopolymers and copolymers, and the prefix "poly" refers to two or more.

EXAMPLES

The following examples are intended to illustrate the invention, and should not be construed as limiting the invention in any way.

Example 1

Into a five-liter four-necked reaction kettle equipped with a thermometer, a mechanic stirrer, a nitrogen inlet, and means for removing the by-product (methanol) were placed 1440.0 parts by weight of CYMEL 303 ((methoxymethyl) melamine-formaldehyde resin from Cytec Specialty Chemicals, Inc.), 1148.8 parts by weight of p-toluic acid (obtained from Wuhan Organic Chemical Company), and 2.0 parts by weight of p-toluenesulfonic acid. The mixture was heated to 145° C. and the temperature was maintained under 1.0 CFH (cubic feet per hour) of nitrogen sparge while the methanol by-product was removed from the system. The reaction progress was monitored by sampling the mixture for acid value regularly. After 31 hours, an acid value of 14.2 was reached and the reaction terminated. The product was allowed to cool slightly and poured out from the reactor. The product thus obtained was a pale yellow solid with a Tg of 25° C.

The procedure was repeated, only the reaction was maintained under constant 6.0 CFH of nitrogen sparge while the methanol by-product was removed from the system. After 12 hours, an acid value of 17.0 was reached and the reaction terminated. The product was allowed to cool slightly and poured out from the reactor. The product thus obtained was a pale yellow solid with a Tg of 24° C. This demonstrates that an increase in reaction rate can be achieved by increasing the rate at which inert gas is introduced.

The process as described above was repeated, only instead of maintaining the reaction under an inert environment, the reaction was maintained under −650 mmHg pressure while the methanol by-product was removed from the system. After 7.5 hours, an acid value of 9.8 was reached and the reaction terminated. The product was allowed to cool slightly and poured out from the reactor. The product thus obtained was a pale yellow solid with a Tg of 25° C. A significant increase in reaction rate was therefore observed when using vacuum.

Whereas particular embodiments of this invention have been described above for purposes of illustration, it will be evident to those skilled in the art that numerous variations of the details of the present invention may be made without departing from the invention as defined in the appended claims.

Therefore, we claim:

1. A method for modifying an aminoplast comprising:
   (a) mixing together:
      (i) at least one aminoplast resin; and
      (ii) at least one modifying compound in an appropriate ratio in a reaction vessel;
   (b) heating the admixture of step (a) to a temperature ranging from 90° C. to 160° C. and
   (c) maintaining the temperature achieved in step (b) for a time sufficient to obtain an ungelled reaction product that has a glass transition temperature of at least 10° C. and that is essentially free of active hydrogen groups; wherein the reaction vessel is maintained under vacuum for at least some of the reaction.

2. The method of claim 1, wherein the reaction vessel is maintained under vacuum for substantially all of the reaction.

3. The method of claim 1, wherein the vacuum is applied at at least about 150 mmHg absolute.

4. The method of claim 1, wherein said aminoplast resin is solid.

5. The method of claim 1, wherein said aminoplast is liquid.

6. The method of claim 1, wherein said modifying compound comprises:
   i) a reactive polyhydric compound;
   ii) a polyester polyol;
   iii) a polyhydric aromatic compound;
   iv) a reactive urethane group;
   v) a monofunctional sulfonamide having only one active hydrogen;
   vi) a polyhydric phenol; and
   vii) a carboxylic acid-containing compound;
   (viii) a monohydroxy aromatic compound having structure (I):

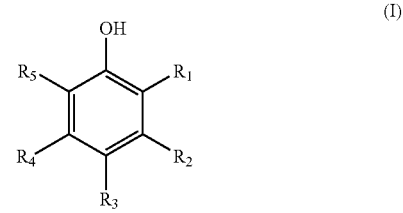

wherein each of $R_1$ through $R_5$ are the same or different and are selected from H, a monovalent hydrocarbon group, $COOR_6$ where $R_6$ is H or a monovalent hydrocarbon group, $NO_2$, halogen or $XR_7$, where X is oxygen and sulfur and $R_7$ is a monovalent hydrocarbon group having 1 to 8 carbon atoms;

(ix) a compound having the following structure (II):

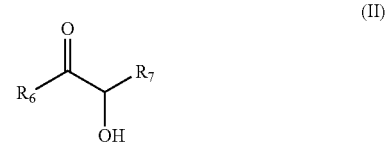

or dimer derivatives thereof, where $R^6$ and $R^7$ are the same or different and each independently represents an aromatic group or an alkyl group having 1 to 12 carbon atoms; and (x) an aromatic heterocycle containing at least one nitrogen atom; and/or (xi) a tall oil rosin.

7. The method of claim 6, wherein said modifying compound comprises acid functionality.

8. The method of claim 7, wherein said modifying compound comprises a carboxylic acid-containing compound.

9. A method for converting a liquid aminoplast resin into an ungelled crosslinking agent comprising:
   (a) mixing together:
      (i) at least one aminoplast resin; and
      (ii) at least one modifying compound in an appropriate ratio in a reaction vessel;

(b) heating the admixture of step (a) to a temperature ranging from 90° C. to 160° C. and (c) maintaining the temperature achieved in step (b) for a time sufficient to obtain an ungelled reaction product that has a glass transition temperature of at least 10° C. and that is essentially free of active hydrogen-containing groups;

wherein the reaction vessel is maintained under vacuum for at least some of the reaction.

10. The method of claim 9, wherein the reaction vessel is maintained under vacuum for substantially all of the reaction.

11. The method of claim 9, wherein said modifying compound comprises:
   i) a reactive polyhydric compound;
   ii) a polyester polyol;
   iii) a polyhydric aromatic compound;
   iv) a reactive urethane group;
   v) a monofunctional sulfonamide having only one active hydrogen;
   vi) a polyhydric phenol;
   vii) a carboxylic acid-containing compound; and
   viii) a monohydroxy aromatic compound having structure (I):

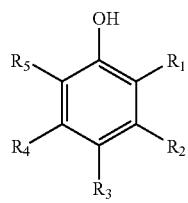

(I)

wherein each of $R_1$ through $R_5$ are the same or different and are selected from H, a monovalent hydrocarbon group, $COOR_6$ where $R_6$ is H or a monovalent hydrocarbon group, $NO_2$, halogen or $XR_7$, where X is oxygen and sulfur and $R_7$ is a monovalent hydrocarbon group having 1 to 8 carbon atoms;

(ix) a compound having the following structure (II):

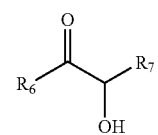

(II)

or dimer derivatives thereof, where $R^6$ and $R^7$ are the same or different and each independently represents an aromatic group or an alkyl group having 1 to 12 carbon atoms;

(x) an aromatic heterocycle containing at least one nitrogen atom; and/or (xi) a tall oil rosin.

12. A method for increasing the reaction rate between at least one aminoplast resin and at least one modifying compound in a reaction vessel comprising:

a) maintaining the reaction vessel under vacuum; and/or b) increasing the rate at which an inert gas is passed through the reaction vessel.

* * * * *

UNITED STATES PATENT AND TRADEMARK OFFICE
CERTIFICATE OF CORRECTION

PATENT NO. : 7,163,748 B2
APPLICATION NO. : 10/434682
DATED : January 16, 2007
INVENTOR(S) : Ronald R. Ambrose et al.

Page 1 of 1

It is certified that error appears in the above-identified patent and that said Letters Patent is hereby corrected as shown below:

Column 14, line 52: "$R^6$ and $R^7$" should read: -- $R_6$ and $R_7$ --

Column 16, line 18: "$R^6$ and $R^7$" should read: -- $R_6$ and $R_7$ --

Signed and Sealed this

Twenty-third Day of December, 2008

JON W. DUDAS
*Director of the United States Patent and Trademark Office*